US012681792B2

(12) United States Patent
Yasuyama et al.

(10) Patent No.: US 12,681,792 B2
(45) Date of Patent: Jul. 14, 2026

(54) NOTIFICATION DEVICE AND CONTROL DEVICE

(71) Applicant: TOYOTA JIDOSHA KABUSHIKI KAISHA, Toyota (JP)

(72) Inventors: Shogo Yasuyama, Okazaki (JP); Kento Iwahori, Nagoya (JP); Daiki Yokoyama, Miyoshi (JP); Yasuhiro Saito, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 18/807,291

(22) Filed: Aug. 16, 2024

(65) Prior Publication Data

US 2025/0117280 A1 Apr. 10, 2025

(30) Foreign Application Priority Data

Oct. 5, 2023 (JP) ................................. 2023-173479

(51) Int. Cl.
*G06F 11/07* (2006.01)
*G06Q 50/04* (2012.01)

(52) U.S. Cl.
CPC ......... *G06F 11/0784* (2013.01); *G06Q 50/04* (2013.01)

(58) Field of Classification Search
None
See application file for complete search history.

(56) References Cited

U.S. PATENT DOCUMENTS

| | | | | |
|---|---|---|---|---|
| 8,010,475 | B2 * | 8/2011 | Zhao | G05B 19/4184 |
| | | | | 706/46 |
| 8,612,276 | B1 * | 12/2013 | Nielsen | G06Q 10/063118 |
| | | | | 705/7.22 |
| 10,274,930 | B2 * | 4/2019 | Canedo | G05B 19/406 |
| 10,538,421 | B2 * | 1/2020 | Blevins | G06Q 10/087 |
| 12,017,856 | B2 * | 6/2024 | Liu | G06Q 10/087 |
| 12,253,371 | B2 * | 3/2025 | Franey | G05D 1/0297 |
| 12,299,610 | B2 * | 5/2025 | Cortese | G06Q 10/087 |
| 2008/0071429 | A1 * | 3/2008 | Kraimer | G08C 17/02 |
| | | | | 701/2 |
| 2009/0196187 | A1 * | 8/2009 | Ooba | H04Q 9/02 |
| | | | | 370/242 |
| 2012/0239224 | A1 * | 9/2012 | McCabe | G05D 1/0297 |
| | | | | 701/2 |
| 2012/0239238 | A1 * | 9/2012 | Harvey | G05D 1/0221 |
| | | | | 701/25 |

(Continued)

FOREIGN PATENT DOCUMENTS

| | | |
|---|---|---|
| DE | 102021124389 A1 | 9/2022 |
| JP | 2004-318536 A | 11/2004 |

(Continued)

*Primary Examiner* — Jonathan M Dager
(74) *Attorney, Agent, or Firm* — Sughrue Mion, PLLC

(57) ABSTRACT
A notification device includes a processor, and the processor is configured to: receive a signal that indicates occurrence of an abnormal state of a mobile body that is movable through unattended operation, and specify a notification target that meets a specification condition determined in advance from one or more specification targets that include at least one of a worker and a station; and send a notification to instruct handling of the abnormal state of the mobile body to the specified notification target.

12 Claims, 8 Drawing Sheets

(56)             References Cited

U.S. PATENT DOCUMENTS

| | | | |
|---|---|---|---|
| 2012/0245765 A1* | 9/2012 | Medwin ................ | B66F 9/0755 |
| | | | 701/2 |
| 2012/0259540 A1* | 10/2012 | Kishore .............. | G01C 21/362 |
| | | | 705/7.14 |
| 2013/0190963 A1* | 7/2013 | Kuss ....................... | B66F 9/063 |
| | | | 701/23 |
| 2013/0332383 A1* | 12/2013 | Anzai .................... | G06Q 10/06 |
| | | | 705/325 |
| 2017/0320529 A1 | 11/2017 | Nordbruch | |
| 2020/0278675 A1* | 9/2020 | Balathandapani .... | H04L 67/125 |
| 2020/0316786 A1* | 10/2020 | Galluzzo ............... | B25J 11/008 |
| 2021/0197808 A1 | 7/2021 | Maeda et al. | |
| 2022/0300875 A1* | 9/2022 | Ams ..................... | B25J 9/1674 |
| 2022/0308565 A1 | 9/2022 | Choi | |
| 2023/0147357 A1 | 5/2023 | Iwai et al. | |
| 2023/0243666 A1* | 8/2023 | Geiger .................. | G01C 21/20 |
| | | | 701/400 |
| 2024/0241519 A1* | 7/2024 | George ............... | G06Q 10/087 |

FOREIGN PATENT DOCUMENTS

| | | |
|---|---|---|
| JP | 2017-538619 A | 12/2017 |
| JP | 2019-152963 A | 9/2019 |
| JP | 2021-528790 A | 10/2021 |
| WO | 2019/077739 A1 | 4/2019 |
| WO | 2019/171337 A1 | 9/2019 |
| WO | 2019/180700 A1 | 9/2019 |
| WO | 2021/199345 A1 | 10/2021 |

* cited by examiner

NOTIFICATION DEVICE — 110

CPU — 111

SPECIFYING UNIT — 113

NOTIFICATION UNIT — 114

STORAGE UNIT — 112

200

| | |
|---|---|
| 210 — BATTERY | VEHICLE CONTROL DEVICE — 250 |
| 220 — DRIVE DEVICE | COMMUNICATION DEVICE — 260 |
| 230 — STEERING DEVICE | EXTERNAL SENSOR — 270 |
| 240 — BRAKING DEVICE | INTERNAL SENSOR — 280 |

FIG. 4

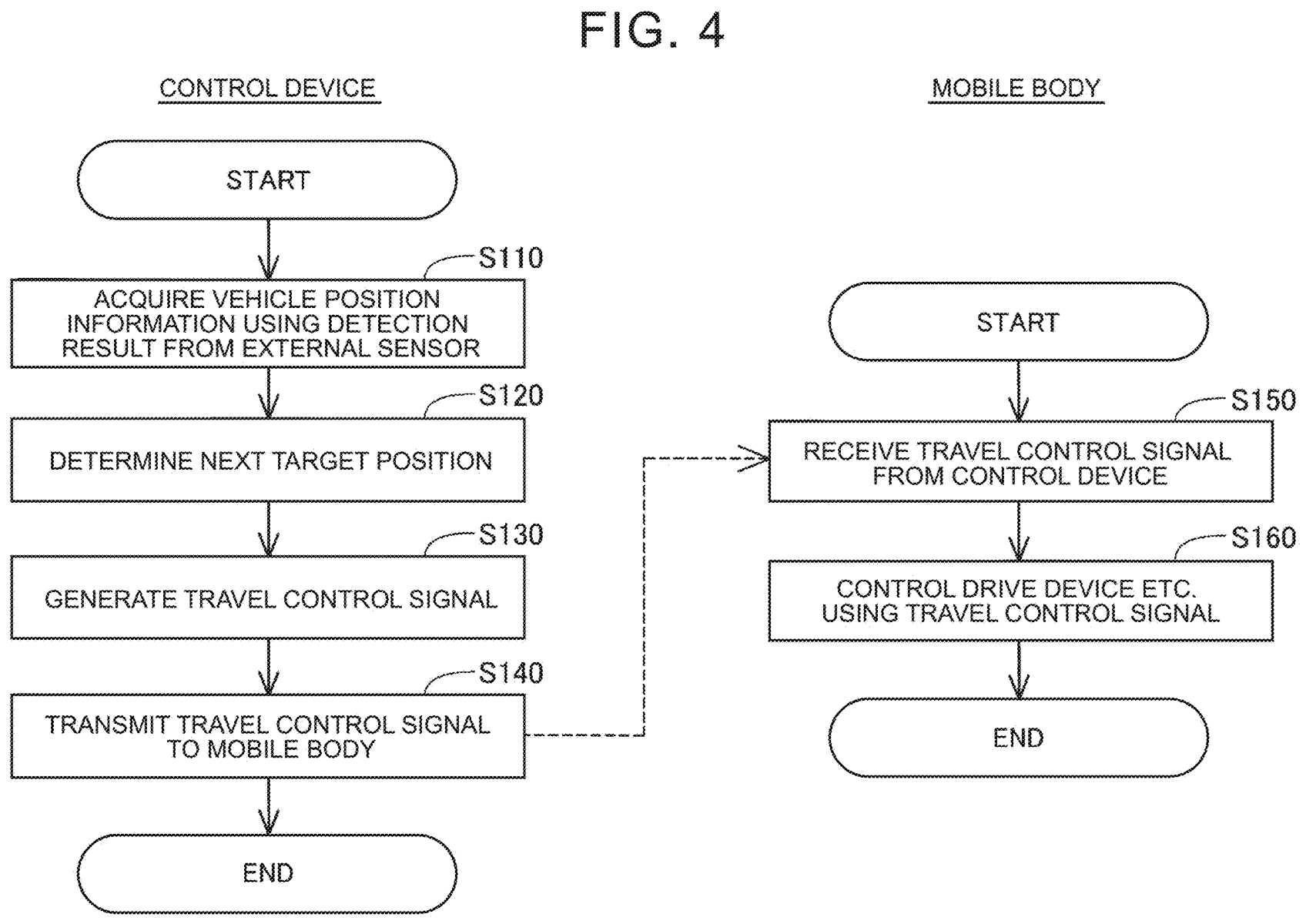

MOBILE BODY

START

RECEIVE TRAVEL CONTROL SIGNAL FROM CONTROL DEVICE — S150

CONTROL DRIVE DEVICE ETC. USING TRAVEL CONTROL SIGNAL — S160

END

CONTROL DEVICE

START

ACQUIRE VEHICLE POSITION INFORMATION USING DETECTION RESULT FROM EXTERNAL SENSOR — S110

DETERMINE NEXT TARGET POSITION — S120

GENERATE TRAVEL CONTROL SIGNAL — S130

TRANSMIT TRAVEL CONTROL SIGNAL TO MOBILE BODY — S140

END

NOTIFICATION DEVICE AND CONTROL DEVICE

CROSS-REFERENCE TO RELATED APPLICATION

This application claims priority to Japanese Patent Application No. 2023-173479 filed on Oct. 5, 2023, incorporated herein by reference in its entirety.

BACKGROUND

1. Technical Field

The present disclosure relates to a notification device and a control device.

2. Description of Related Art

There is known a technique of causing a mobile body to travel through unattended operation in a process of manufacturing a mobile body, as described in Japanese Patent Application Publication (Translation of PCT Application) No. 2017-538619, for example.

SUMMARY

When a mobile body is stopped because of a certain failure caused while the mobile body is moved through unattended operation, a worker may be requested to take action. When a notification to request action is sent to all the workers and all the stations where the workers are standing by, the notification may be sent to workers and stations that are not suitable to take action, such as workers situated at locations far from the stopped mobile body and stations where no workers are standing by, for example.

The present disclosure can be implemented as the following aspects.

A first aspect of the present disclosure provides a notification device. The notification device includes a processor, and the processor is configured to: receive a signal that indicates occurrence of an abnormal state of a mobile body that is movable through unattended operation, and specify a notification target that meets a specification condition determined in advance from one or more specification targets that include at least one of a worker and a station; and send a notification to instruct handling of the abnormal state of the mobile body to the specified notification target.

With the notification device according to this aspect, a notification to instruct handling of the abnormal state of the mobile body is sent to the notification target that meets the specification condition, and therefore a notification can be sent to appropriate workers and stations.

In the notification device according to the above aspect, the handling may not include controlling the mobile body through the unattended operation.

With the notification device according to this aspect, a worker can be instructed to move the mobile body in which an abnormal state has occurred through attended operation, for example.

In the notification device according to the above aspect, the processor may be configured to notify the notification target of a mobile body position that indicates a position of the mobile body.

With the notification device according to this aspect, the notification target can be notified of the position of the mobile body.

In the notification device according to the above aspect, the specific condition may include a distance between the mobile body position and a located position of a specification target of the one or more specification targets being equal to or less than a first threshold distance determined in advance; and the processor may be configured to specify the specification target for which the distance between the mobile body position and the located position is equal to or less than the first threshold distance.

With the notification device according to this aspect, a notification can be sent to a notification target positioned at a short distance from the mobile body.

In the notification device according to the above aspect, the specific condition may include a status of work of a specification target of the one or more specification targets; and the processor may be configured to specify the specification target, the status of work of which allows the handling.

With the notification device according to this aspect, a notification to instruct handling of the abnormal state of the mobile body can be sent to a notification target that is highly likely able to handle the abnormal state of the mobile body, since an available specification target is specified, for example.

In the notification device according to the above aspect, the specification condition may include that the specification target is not performing work that is more urgent than the handling of the abnormal state; and the processor may be configured to specify the specification target that is not performing the work that is more urgent.

With the notification device according to this aspect, a notification can be sent to a notification target that is not performing urgent work.

In the notification device according to the above aspect, the specification condition may include a manufacturing process in which the mobile body is positioned; and the processor may be configured to specify a specification target of the one or more specification targets correlated with the manufacturing process.

With the notification device according to this aspect, a notification can be sent to a notification target that belongs to the manufacturing process in which the mobile body is positioned, for example.

In the notification device according to the above aspect, the specification condition may include a cause of the occurrence of the abnormal state; and the processor may be configured to specify a specification target of the one or more specification targets capable of handling the cause.

With the notification device according to this aspect, a notification can be sent to a notification target capable of handling the cause.

In the notification device according to the above aspect, the processor may be configured to notify the notification target that the handling is completed in response to the handling being completed.

With the notification device according to this aspect, it is possible to suppress a notification target that has received a notification to instruct handling of the abnormal state of the mobile body attempting to handle the abnormal state of the mobile body for which handling of the abnormal state has already been completed.

A control device may include a processor, and the processor may be configured to perform evacuation control of the mobile body through the unattended operation when a notification that the notification target that meets the specification condition is not present is received from the notification device according to the above aspect. With the control device according to this aspect, the mobile body can be evacuated even when the abnormal state of the mobile body cannot be handled directly by the worker.

In the above notification device, the unattended operation may include a manual mode based on operations performed by the worker using an input device provided at a different location from the mobile body, and an automatic mode not based on operations performed by the worker using the input device; the abnormal state may be caused in the automatic mode; and the handling may be an operation of input device. With the notification device according to this aspect, a notification to instruct operations of the input device is sent to the notification target that meets the specification condition. Therefore, a notification can be sent to appropriate workers and stations.

The notification device according to the above aspect may further include a storage unit that stores an installation position of the input device; the specification condition includes a distance between the installation position and a located position of a specification target of the one or more specification targets being equal to or less than a second threshold distance determined in advance; and the processor may be configured to specify the specification target for which the distance between the installation position and the located position is equal to or less than the second threshold distance.

With the notification device according to this aspect, a notification can be sent to the notification target at a short distance from the input device.

In the notification device according to the above aspect, the specific condition may include a status of work of a specification target of the one or more specification targets; and the processor may be configured to specify the specification target in a status of work that allows the specification target to operate the input device.

With the notification device according to this aspect, a notification to instruct the unattended operation can be sent to a notification target that is highly likely able to perform the unattended operation using the input device.

In the notification device according to the above aspect, the specification condition may include that the specification target is not performing work that is more urgent than the handling of the abnormal state; and the processor may be configured to specify the specification target that is not performing the work that is more urgent.

With the notification device according to this aspect, a notification can be sent to a notification target that is not performing urgent work.

In the notification device according to the above aspect, the processor may be configured to send a notification to instruct the handling of the abnormal state of the mobile body, the handling not including controlling the mobile body through the unattended operation, to at least a part of the one or more specification targets when the notification target that meets the specification condition is not present.

With the notification device according to this aspect, the abnormal state of the mobile body can be handled even when the unattended operation cannot be performed using the input device.

A control device may include a processor, and the processor may be configured to perform evacuation control of the mobile body in the automatic mode when a notification that the notification target that meets the specification condition is not present is received from the notification device according to the above aspect.

With the control device according to this aspect, the mobile body can be evacuated even when the unattended operation cannot be performed using the input device.

The present disclosure can be implemented in a variety of forms including a remote operation system, a mobile body control device, a remote autonomous driving method, a method of manufacturing a mobile body, a method of controlling a control device, a method of controlling a remote operation system, a method of controlling a mobile body, a computer program that implements such control methods, a non-transitory storage medium that stores the computer program, etc., for example.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 4 is a flowchart illustrating an example of a method of causing a mobile body to travel;

DETAILED DESCRIPTION OF EMBODIMENTS

A. First Embodiment

Figure 1:
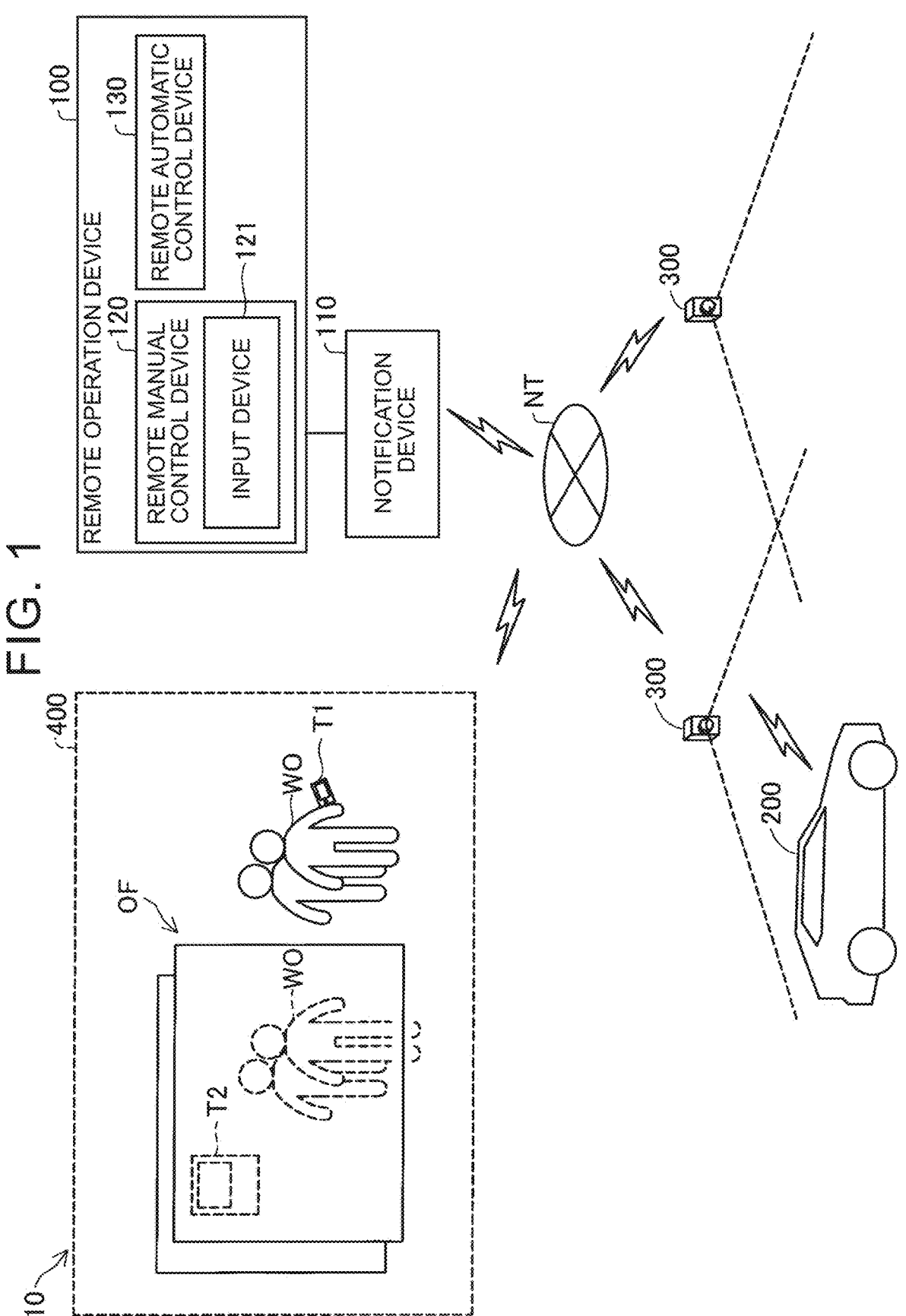
FIG. 1 illustrates the configuration of a remote operation system.

FIG. 1 illustrates the configuration of a remote operation system 10 according to a first embodiment. The remote operation system 10 is used to move a mobile body 200 through unattended operation in a factory that produces the mobile body 200.

The term "unattended operation" means operation not based on driving operations by a passenger. The driving operations mean operations related to at least one of "traveling", "turning", and "stopping" of a vehicle. The unattended operation is achieved through automatic or manual remote control performed using a device provided external to the vehicle or through autonomous control of the vehicle. A passenger that does not perform the driving operations may be on board the vehicle that travels through the unattended operation. Examples of the passenger that does not perform the driving operations include a person simply seated on a seat of the vehicle and a person that performs work different from the driving operations, such assembly, inspection, and operation of switches, while being on board the vehicle. Operation based on the driving operations by a passenger is occasionally referred to as "attended operation".

In the present embodiment, the unattended operation includes a manual mode and an automatic mode. The manual mode is a mode based on operations performed using an input device 121 by a worker WO to be discussed later. The automatic mode is a mode not based on operations performed using the input device 121 by the worker WO.

The remote operation system 10 includes a control device 100, a notification device 110, a mobile body 200, and detection devices 300.

The control device 100 is a device that remotely operates the mobile body 200 in a process of manufacturing the mobile body 200. The control device 100 includes a remote manual control device 120 and a remote automatic control device 130. In the present embodiment, the remote manual control device 120 and the remote automatic control device 130 are constituted integrally with each other. The control device 100 is provided at a different location from the mobile body 200. The control device 100 and the notification device 110 can communicate with each other. The remote manual control device 120 and the remote automatic control device 130 are each an example of a remote operation device.

The notification device 110 is a device that notifies a notification target specified from a specification target 400 upon receiving a signal that indicates the occurrence of an abnormal state of the mobile body 200 operated through remote operations by the remote manual control device 120 and the remote automatic control device 130. In the present embodiment, the abnormal state of the mobile body 200 refers to a state in which the mobile body 200 has been subjected to an abnormal stop. The abnormal stop refers to an unintended stop of the mobile body 200 that is remotely operated. In the present embodiment, the specification target 400 includes a plurality of workers WO and a plurality of stations OF. The stations OF are each a location where the workers WO take a rest or stand by. The notification device 110 sends a notification to the workers WO via a terminal device T1 of the workers WO, and sends a notification to the stations OF via a terminal device T2 installed at the stations OF.

Figure 2:
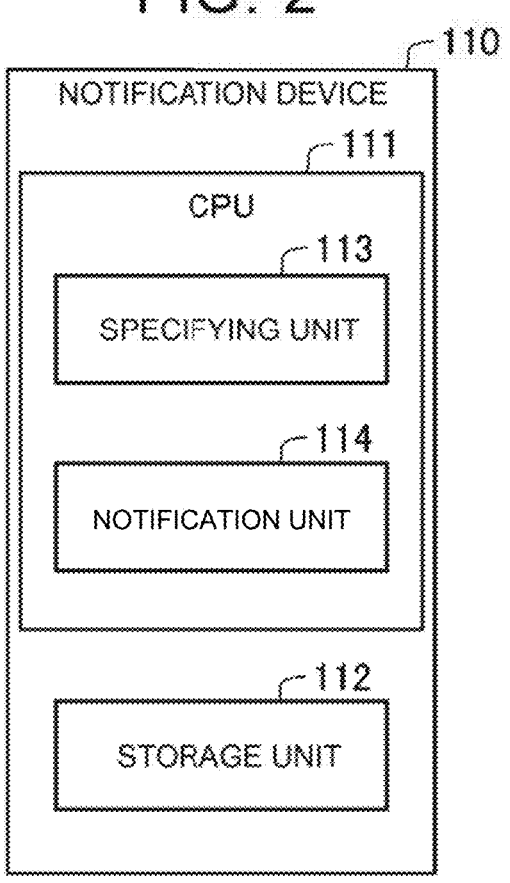
FIG. 2 is a schematic diagram illustrating an overview of a notification device.

FIG. 2 is a schematic diagram illustrating an overview of the notification device 110. The notification device 110 is composed of a computer constituted of a central processing unit (CPU), a random access memory (RAM), a read only memory (ROM), etc., and implements the functions of a specifying unit 113 and a notification unit 114 by a CPU 111 executing a program installed in advance in a storage unit 112 of the notification device 110. However, some or all of the functions of such units may be implemented by a hardware circuit. The CPU 111 may be a processor, for example.

The specifying unit 113 specifies a notification target that meets a specification condition determined in advance from the specification target 400 in response to the occurrence of an abnormal state of the mobile body 200 operated through remote operations. Examples of the specification condition include a condition about the position of the specification target 400, the status of work of the specification target 400, the manufacturing process in which the mobile body 200 is positioned, and the cause of the occurrence of the abnormal state of the mobile body 200. The specification condition will be discussed in detail later. The specifying unit 113 specifies the specification target 400 at a short distance from the mobile body 200, the specification target 400 in a status of work that allows the specification target 400 to handle the mobile body 200, the specification target 400 correlated with the manufacturing process in which the mobile body 200 is positioned, and the specification target 400 that can take action with the cause of the occurrence of the abnormal state of the mobile body 200, and that meets the specification condition.

The notification unit 114 sends a notification to instruct handling of the abnormal state of the mobile body 200 to the notification target specified by the specifying unit 113. The handling of the stop of the mobile body 200 is work that does not include remote operations. In the present embodiment, the handling of the abnormal state of the mobile body 200 includes collecting the mobile body 200 and moving the mobile body 200 through attended operation.

The remote manual control device 120 (see FIG. 1) is a device that remotely operates the mobile body 200 according to operations by the worker WO. That is, the remote manual control device 120 is a device that performs unattended operation in the manual mode. More specifically, the remote manual control device 120 remotely operates the mobile body 200 according to a travel control signal generated according to operations of the input device 121 by the worker WO. The input device 121 includes a steering wheel, an accelerator pedal, a brake pedal, etc. (not illustrated). The mobile body 200 adopts a steer-by-wire system, a throttle-by-wire system, and a brake-by-wire system. In the remote manual control device 120, the input device 121 and a control unit that generates a control instruction value may be provided away from each other. The travel control signal includes the travel route (path), position, travel speed, acceleration, and wheel steering angle of the mobile body 200, for example. The control unit may be a processor, for example.

The remote automatic control device 130 is a device that remotely operates the mobile body 200 without the need for operations by the worker WO. That is, the remote automatic control device 130 is a device that performs unattended operation in the automatic mode. More specifically, the remote automatic control device 130 remotely operates the mobile body 200 by generating a control instruction value not according to operations of the input device 121 by the worker WO. the remote automatic control device 130 may be a processor, for example.

In the present embodiment, the mobile body 200 is a vehicle. More specifically, the mobile body 200 is a battery electric vehicle (BEV). The mobile body 200 is not limited to a battery electric vehicle, and may be a gasoline vehicle, a hybrid electric vehicle, or a fuel cell electric vehicle, for example. The mobile body 200 is not limited to a vehicle, and may be an electric vertical take-off and landing aircraft (a so-called flying vehicle), for example. When the mobile body is not a vehicle, the expression "travel" as used in the present disclosure may be replaced with "move" as appropriate.

Figure 3:
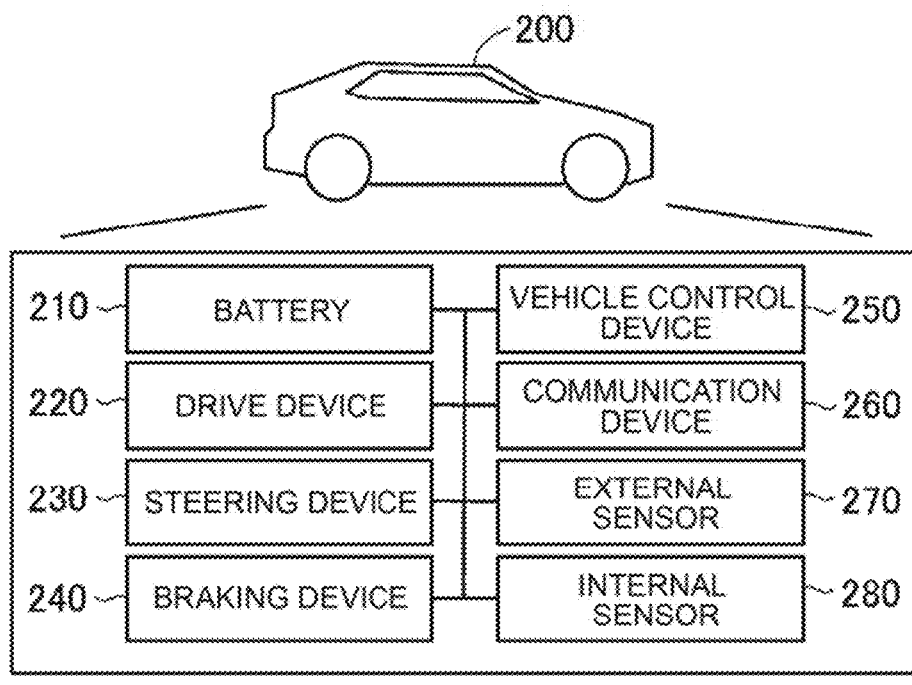
FIG. 3 is a schematic diagram illustrating an overview of a mobile body.

FIG. 3 is a schematic diagram illustrating an overview of the mobile body 200. The mobile body 200 includes: a battery 210 that is a power source of the mobile body 200; a drive device 220 that drives the mobile body 200; a steering device 230 that changes the advancing direction of the mobile body 200; a braking device 240 that decelerates the mobile body 200; a mobile body control device 250 that controls various portions of the mobile body 200 according to operations from the outside of the mobile body 200; a communication device 260 that communicates with the control device 100 through wireless communication; an external sensor 270 that can detect the surroundings of the mobile body 200; and an internal sensor 280 that can acquire information that indicates the state of the mobile body 200.

In the present embodiment, the drive device 220 includes a travel motor and drive wheels to be rotated by the travel motor. The mobile body control device 250 is constituted of two or more electronic control units. The mobile body control device 250 can cause the mobile body 200 to travel by controlling the various portions of the mobile body 200 according to operations by a driver when the driver is on the mobile body 200. The mobile body control device 250 can cause the mobile body 200 to travel by controlling the various portions of the mobile body 200 according to a control instruction from the control device 100, irrespective of whether a driver is on the mobile body 200.

The communication device 260 communicates with the outside of the mobile body 200 through controller area network (CAN) communication, for example. The CAN communication is a communication standard that allows transmission and reception in multiple directions. The communication device 260 communicates with the control device 100 connected to a network NT via an access point (not illustrated) in a factory, for example.

The external sensor 270 is a sensor capable of detecting a target that is present around the mobile body 200. The external sensor 270 may include an in-vehicle camera, a radar, a lidar, etc., for example.

The internal sensor 280 is a sensor capable of detecting various physical quantities necessary to control operation of the mobile body 200. The internal sensor 280 may include a current sensor, a voltage sensor, a battery temperature sensor, a wheel speed sensor, a steering angle sensor, a global navigation satellite system (GNSS) receiver that receives GNSS information, etc., for example.

The detection devices 300 are each a device that detects the mobile body 200, the surroundings of the mobile body 200, and the worker WO. In the present embodiment, the detection devices 300 are cameras. The detection devices 300 are installed in a factory. The detection devices 300 communicate with the control device 100 connected to the network NT via an access point (not illustrated) in the factory, for example. In the present embodiment, the detection devices 300 specify the position, shape, etc. of the mobile body 200, the position, shape, etc. of objects that are present in a region around the mobile body 200, and the position, operation, etc. of the worker WO using detected information. The detection devices 300 transmit specified information to the control device 100.

FIG. 4 is a flowchart illustrating a method by which the remote operation system 10 according to the present embodiment causes the mobile body 200 to travel. In step S110, the control device 100 acquires position information on the mobile body 200 using a detection result output from the detection devices 300 positioned outside the mobile body 200. In the present embodiment, the position information on the mobile body 200 includes X, Y, and Z coordinates in a global coordinate system of the factory. The detection devices 300 are cameras installed in the factory, and output an image as the detection result. The positions and the orientations of the detection devices 300 are adjusted in advance. The control device 100 detects the mobile body 200 from the images acquired from the detection devices 300, and acquires position information on the mobile body 200 in the factory from the position of the mobile body 200 in the images. The control device 100 can detect the mobile body 200 from the images using a machine learning model trained in advance so as to detect the mobile body 200 from the images, for example.

In step S120, the control device 100 determines a target position for which the mobile body 200 should be bound next. In the present embodiment, the target position is represented by X, Y, and Z coordinates in the global coordinate system of the factory. The control device 100 stores a reference path in advance as a path along which the mobile body 200 should travel. The path is represented by a node that indicates a departure location, nodes that indicate pass points, a node that indicates a destination location, and links that connect between the nodes. The control device 100 determines the target position for which the mobile body 200 should be bound next using the position information on the mobile body 200 and the reference path. The control device 100 determines the target position on the reference path further ahead of the present location of the mobile body 200.

In step S130, the control device 100 generates a travel control signal for causing the mobile body 200 to travel toward the determined target position. In the present embodiment, the travel control signal includes the acceleration and the steering angle of the mobile body 200 as parameters. The control device 100 calculates a travel speed of the mobile body 200 from transitions in position of the mobile body 200, and makes a comparison between the calculated travel speed and a target speed for the mobile body 200 determined in advance. The control device 100 determines the acceleration such that the mobile body 200 accelerates when the travel speed is lower than the target speed, and determines the acceleration such that the mobile body 200 decelerates when the travel speed is higher than the target speed. The control device 100 determines the steering angle and the acceleration such that the mobile body 200 does not deviate from the reference path when the mobile body 200 is positioned on the reference path, and determines the steering angle and the acceleration such that the mobile body 200 returns to the reference path when the mobile body 200 is not positioned on the reference path, or in other words when the mobile body 200 has deviated from the reference path.

In S140, the control device 100 transmits the generated travel control signal to the mobile body 200. The control device 100 acquires position information on the mobile body 200, determines a target position, generates a travel control signal, and transmits the travel control signal repeatedly in predetermined cycles.

In step S150, the mobile body control device 250 mounted on the mobile body 200 receives the travel control signal from the control device 100. In step S160, the mobile body control device 250 controls the drive device 220, the steering device 230, and the braking device 240 using the received travel control signal so as to cause the mobile body 200 to travel at the acceleration and the steering angle represented by the travel control signal. The mobile body control device 250 receives the travel control signal and controls the drive device 220, the steering device 230, and the braking device 240 repeatedly in predetermined cycles. With the remote operation system 10 according to the present embodiment, the mobile body 200 can be caused to travel through remote control, and therefore the mobile body 200 can be moved without using conveyance equipment such as a crane or a conveyor.

The position of the mobile body 200 and the orientation of the mobile body 200 are estimated using the captured image acquired by the detection devices 300 provided at different locations from the mobile body 200. The position of the mobile body 200 can be acquired by calculating the coordinates of measurement points of the mobile body 200 in an image coordinate system using the outer shape of the mobile body 200 detected from the captured image, and converting the calculated coordinates into coordinates in the global coordinate system, for example. The orientation of the mobile body 200 can be estimated based on the orientation of a movement vector of the mobile body 200 calculated from variations in position of feature points of the mobile body 200 between frames of the captured image using an optical flow method, for example. The orientation of the mobile body 200 may be calculated using the output result from a yaw rate sensor etc. mounted on the mobile body 200, for example.

The outer shape of the mobile body 200 included in the captured image can be detected by inputting the captured image to a detection model that makes use of artificial intelligence, for example. Examples of the detection model include a trained machine learning model that has been trained so as to achieve one of semantic segmentation and instance segmentation, for example. As the machine learning model, a convolutional neural network (hereinafter referred to as a "CNN") trained through supervised learning with input of a learning data set can be used, for example. The learning data set includes a plurality of training images including the mobile body 200, and a correct answer label indicating whether each region in the training images is a region indicating the mobile body 200 or a region indicating an area other than the mobile body 200, for example. During training of the CNN, parameters of the CNN are preferably updated so as to reduce an error between the result output from the detection model and the correct answer label through back propagation (error back propagation method).

Figure 5:
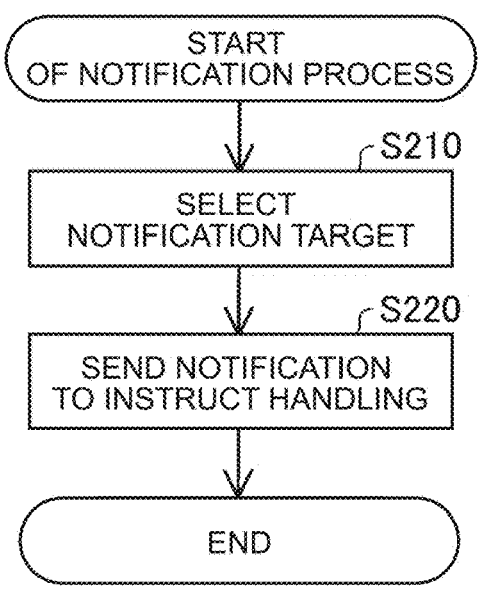
FIG. 5 is a flowchart illustrating an example of a notification process.

FIG. 5 is a flowchart illustrating an example of a notification process. The notification process is a process in which the notification device 110 sends a notification to instruct handling of the abnormal state of the mobile body 200 to specified notification target. In the present embodiment, this process is performed when the mobile body 200 operated through remote operations is unintentionally stopped. The notification device 110 executes the notification process when a signal indicating that the mobile body 200 has been unintentionally stopped is received from the mobile body 200 or when a signal indicating that the mobile body 200 has been unintentionally stopped is received from the control device 100 or the detection device 300, for example. In the present embodiment, the handling of the abnormal state is a process that does not include controlling the mobile body 200 through unattended operation.

In step S210, the notification device 110 specifies a notification target. More specifically, the notification device 110 specifies a notification target that meets a first specification condition from the specification target 400. It can be determined whether the specification target 400 meets the first specification condition using a detection signal from the external sensor 270 or the internal sensor 280 of the mobile body 200 or a detection signal from the detection device 300. One or more of the following conditions, for example, can be adopted as the first specification condition. The term "specify" as used herein may be replaced with "select".

Condition 1

The distance between a mobile body position, as the position of the mobile body 200, and a located position, as the position of the specification target 400, is equal to or less than a first threshold distance determined in advance.

Condition 2

Not in the break

Condition 3

The worker WO is standing by.

Condition 4

No urgent work is being done.

Condition 5

Working in the manufacturing process in which the mobile body 200 is positioned when stopped Condition 6

The distance between equipment that caused the mobile body 200 to stop and the located position is equal to or less than a second threshold distance determined in advance.

Condition 7

Being able to handle the cause of the stop of the mobile body 200

The mobile body position in Condition 1 above is specified by the GNSS receiver of the mobile body 200 or the detection devices 300, for example. The located position is specified by the GNSS receiver of the terminal device T1 or the detection device 300, for example. Information that indicates the position of the station OF is stored in the storage unit 112, for example. When Condition 1 is not met, the distance between the specification target 400 and the mobile body 200 is long, and therefore it takes time for the worker WO to reach the mobile body 200. Thus, the first specification condition preferably includes Condition 1.

When Condition 2 above is not met, the worker WO is in the break, and it is not desirable to instruct the worker WO to handle the stop of the mobile body 200 outside the working hours. Thus, the first specification condition preferably includes Condition 2. The specifying unit 113 determines whether the specification target 400 is in the break using shift information on the specification target 400 stored in the storage unit 112, for example.

When Condition 3 above is not met, no worker WO is present at the station OF, and therefore a notification to instruct handling of the stop of the mobile body 200 may not be received, even if such a notification is sent. Thus, the first specification condition preferably includes Condition 3. The specifying unit 113 determines whether the worker WO is standing by at the station OF using information indicating the presence or absence of entry and exit of the worker WO into and from the station OF detected by the detection device 300, for example.

The urgent work in Condition 4 above is work that is more urgent than the handling of the abnormal state of the mobile body 200, such as work related to safety such as handling of an abnormality, for example. When Condition 4 is not met, the specification target 400 is performing urgent work that cannot be interrupted, and therefore the stop of the mobile body 200 may not be handled, even if a notification to instruct handling of the stop of the mobile body 200 is sent. Thus, the first specification condition preferably includes Condition 4. This allows the specifying unit 113 to specify the specification target 400 that is not performing urgent work. The specifying unit 113 determines whether the specification target 400 is performing urgent work using information that indicates operation of the specification target 400 specified by the detection device 300, for example.

When Condition 5 above is met, there is a high possibility that the specification target 400 is positioned at a short distance from the mobile body 200. There is also a high possibility that the specification target 400 can resolve the cause of the stop of the mobile body 200. Thus, the first specification condition preferably includes Condition 5. The specifying unit 113 determines whether the specification target 400 is working in the manufacturing process in which the mobile body 200 is positioned when stopped using information stored in the storage unit 112 and indicating the manufacturing process to which the specification target 400 belongs, for example.

When Condition 6 above is met, the specification target 400 is positioned at a short distance from the equipment that has caused the stop of the mobile body 200, and therefore the time required to resolve the cause can be shortened. Thus, the first specification condition preferably includes Condition 6. The equipment that has caused the stop of the mobile body 200 is specified using whether an abnormality is detected, for example. The specifying unit 113 calculates the distance between the position of the equipment as the cause and the located position of the specification target 400 using position information on the equipment stored in advance in the storage unit 112, for example.

When Condition 7 above is met, the worker WO can resolve the cause of the stop of the mobile body 200. Thus, the first specification condition preferably includes Condition 7. The specifying unit 113 determines whether the cause can be handled using information stored in advance in the storage unit 112 and indicating causes that can be handled by the specification target 400, for example.

A first specification condition can be set by combining Conditions 1 to 7 above and other conditions as appropriate. In the present embodiment, Condition 1 discussed above is adopted.

In step S220, the notification device 110 sends a notification to instruct handling of the abnormal state of the mobile body 200 to the notification target specified in step S210. More specifically, the notification device 110 sends a notification to the terminal device T1 of the worker WO as the notification target and the terminal device T2 installed at the station OF as the notification target. The notification device 110 sends a message that says "Mobile body 200 has been stopped. Please take action", for example. In the present embodiment, the notification device 110 sends a notification of the mobile body position as the position of the mobile body 200 to be handled, together with an instruction to handle the mobile body 200.

With the notification device 110 according to the present embodiment described above, a notification to instruct handling of the abnormal state of the mobile body 200 is sent to the notification target that meets the specification condition. Therefore, a notification can be sent to appropriate workers WO and stations OF.

The notification unit 114 notifies the notification target of the mobile body position. Therefore, the notification target can head for the mobile body 200 without the need for work to specify the position of the mobile body 200 in an abnormal state. When a plurality of mobile bodies 200 is present, in addition, the notification target can head for the mobile body 200 in an abnormal state without the need for work to specify which one of the mobile bodies 200 is the mobile body 200 in an abnormal state.

The first specification condition includes the distance between the mobile body position and the located position being equal to or less than a first threshold distance. Therefore, the notification unit 114 can send a notification to the notification target at a short distance from the mobile body 200.

B. Second Embodiment

Figure 6:
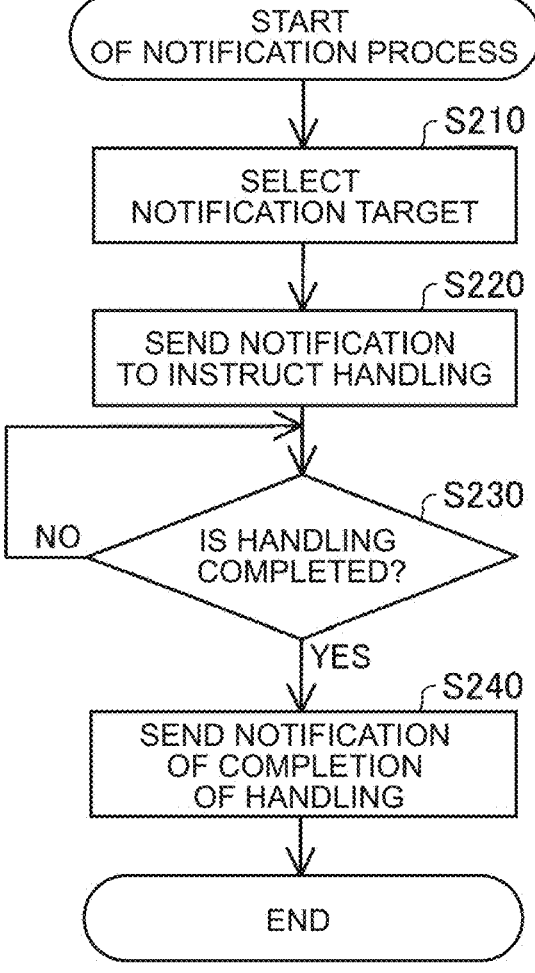
FIG. 6 is a flowchart illustrating an example of a notification process according to a second embodiment.

FIG. 6 is a flowchart illustrating an example of a notification process according to a second embodiment. The notification process according to the second embodiment is different from that according to the first embodiment in that a notification of completion of handling of the abnormal state of the mobile body 200 is made when handling is completed after a notification to instruct handling is made. The configuration of the remote operation system 10 according to the second embodiment is the same as that according to the first embodiment.

The notification device 110 determines in step S230 whether handling of the abnormal state of the mobile body 200 in which an abnormality has occurred is completed. More specifically, the notification device 110 determines whether a signal for completion of handling by the worker WO that has handled the stop of the mobile body 200 is received. When handling of the stop of the mobile body 200 is completed, the notification device 110 proceeds to the process in step S240. When handling of the abnormal state of the mobile body 200 is not completed, on the other hand, the notification device 110 returns to the process in step S230. That is, the process in step S230 is repeatedly performed until handling of the abnormal state of the mobile body 200 is completed.

In step S240, the notification device 110 notifies the notification target specified in step S210 that handling of the abnormal state of the mobile body 200 is completed.

With the notification device 110 according to the second embodiment described above, the notification target is notified that handling is completed. Therefore, it is possible to suppress the notification target that has received a notification to instruct handling of the abnormal state of the mobile body 200 attempting to handle the abnormal state of the mobile body 200 for which handling of the abnormal state has already been completed.

C. Third Embodiment

Figure 7:
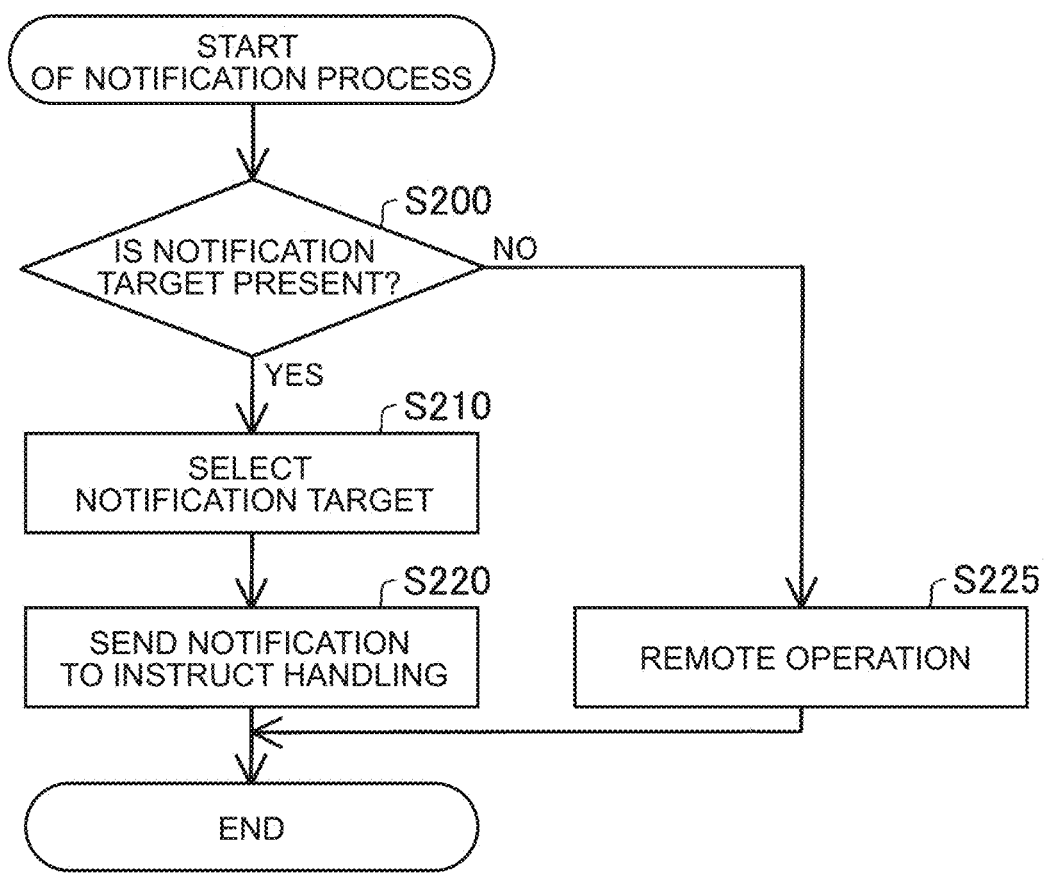
FIG. 7 is a flowchart illustrating an example of a notification process according to a third embodiment.

FIG. 7 is a flowchart illustrating an example of a notification process according to a third embodiment. The notification process according to the third embodiment is different from that according to the first embodiment in that the mobile body 200 is evacuated through remote operations when no notification target is present. The configuration of the remote operation system 10 according to the third embodiment is the same as that according to the first embodiment.

In step S200, the notification device 110 determines whether a notification target is present. More specifically, the notification device 110 determines whether a specification target 400 that meets the first specification condition is present. When a specification target 400 that meets the first specification condition is present, that is, when a notification target is present, the notification device 110 proceeds to the process in step S210. When a specification target 400 that meets the first specification condition is not present, that is, when a notification target is not present, on the other hand, the notification device 110 proceeds to the process in step S225.

In step S225, the notification device 110 instructs the control device 100 to perform control so as to evacuate the mobile body 200 through remote operations. In the present embodiment, the notification device 110 instructs the remote automatic control device 130 to perform control so as to evacuate the mobile body 200. When an instruction is received from the notification device 110, the remote automatic control device 130 evacuates the mobile body 200 through remote operations.

With the notification device 110 according to the third embodiment described above, control for evacuating the mobile body 200 through remote operations is performed when no notification target is present. Therefore, the mobile body 200 can be evacuated even when the abnormal state of the mobile body 200 cannot be handled.

D. Fourth Embodiment

Figure 8:
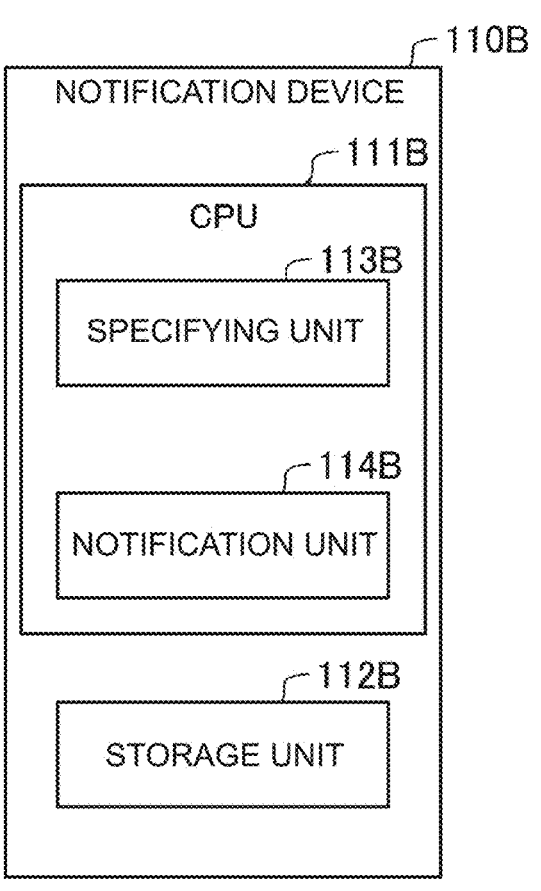
FIG. 8 is a schematic diagram illustrating an overview of a notification device according to a fourth embodiment.

FIG. 8 is a schematic diagram illustrating an overview of a notification device 110B according to a fourth embodiment. The notification device 110B according to the fourth embodiment is different from that according to the first embodiment in that a notification to instruct remote operations of the mobile body 200 through operations of the input device 121 is sent to the notification target. The configuration of the remote operation system 10 according to the fourth embodiment is the same as that according to the first embodiment.

The notification device 110B is a device that notifies a notification target specified from a specification target 400 in response to the occurrence of an abnormal state of the mobile body 200 operated through remote operations by the remote manual control device 120 and the remote automatic control device 130.

The notification device 110B is composed of a computer constituted of a central processing unit (CPU), a random access memory (RAM), a read only memory (ROM), etc., and implements the functions of a specifying unit 113B and a notification unit 114B by a CPU 111B executing a program installed in advance in a storage unit 112B of the notification device 110B. However, some or all of the functions of such units may be implemented by a hardware circuit.

The specifying unit 113B specifies a notification target that meets a specification condition determined in advance from the specification target 400 in response to an unintended stop of the mobile body 200 operated through remote operations. Examples of the specification condition include a condition about the position of the specification target 400 and a condition about the status of work of the specification target 400, for example. The specification condition will be discussed in detail later.

The notification unit 114B sends a notification to instruct remote operations of the mobile body 200 using the input device 121 to the notification target specified by the specification unit 113B.

Figure 9:
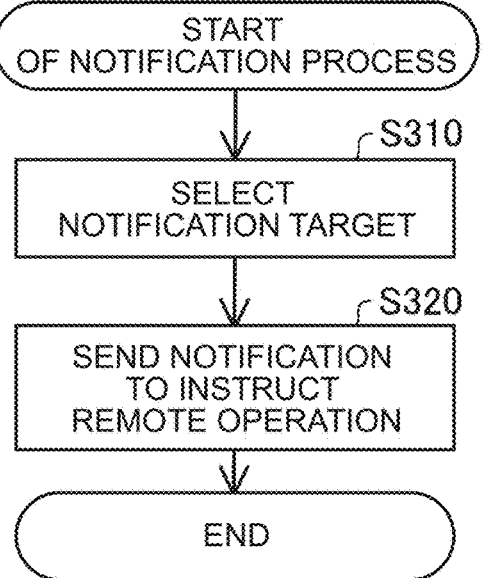
FIG. 9 is a flowchart illustrating an example of a notification process according to a fourth embodiment.

FIG. 9 is a flowchart illustrating an example of a notification process. The notification process is a process in which the notification device 110B sends a notification to instruct remote operations of the mobile body 200 using the input device 121. In the present embodiment, this process is performed when the mobile body 200 operated through remote operations by the remote automatic control device 130 is unintentionally stopped.

In step S310, the notification device 110B specifies a notification target. More specifically, the notification device 110B specifies a notification target that meets a second specification condition determined in advance from the specification target 400. It can be determined whether the specification target 400 meets the second specification condition using a detection signal from the external sensor 270 or the internal sensor 280 of the mobile body 200 or a detection signal from the detection device 300. One or more of the following conditions, for example, can be adopted as the second specification condition.

Condition 1
The distance between an installation position of the input device 121 and a located position, as the position of the specific target 400, is equal to or less than a third threshold distance determined in advance.

Condition 2
Not in the break
Condition 3
The worker WO is standing by.
Condition 4
No urgent work is being done.

The installation position of the input device 121 in Condition 1 above is stored in the storage unit 112B, for example. When Condition 1 is not met, the distance between the specification target 400 and the input device 121 is long, and therefore it takes time for the worker WO to reach the input device 121. Thus, the second specification condition preferably includes Condition 1.

A second specification condition can be set by combining Conditions 1 to 4 above and other conditions as appropriate. In the present embodiment, Condition 1 discussed above is adopted.

In step S320, the notification device 110B sends a notification to instruct remote operations of the mobile body 200 using the input device 121 to the notification target specified in step S310. More specifically, the notification device 110B sends a notification to the terminal device T1 of the worker WO as the notification target and the terminal device T2 installed at the station OF as the notification target. In the present embodiment, the notification device 110B sends a notification of the mobile body 200 to be remotely operated, together with an instruction to remotely operate the mobile body 200.

With the notification device 110B according to the present embodiment described above, a notification to instruct operations of the input device 121 is sent to the notification target that meets the specification condition. Therefore, a notification can be sent to appropriate workers WO and stations OF.

The second specification condition includes the distance between the installation position and the located position being equal to or less than a second threshold distance. Therefore, the notification unit 114B can send a notification to the notification target at a short distance from the input device 121.

E. Fifth Embodiment

Figure 10:
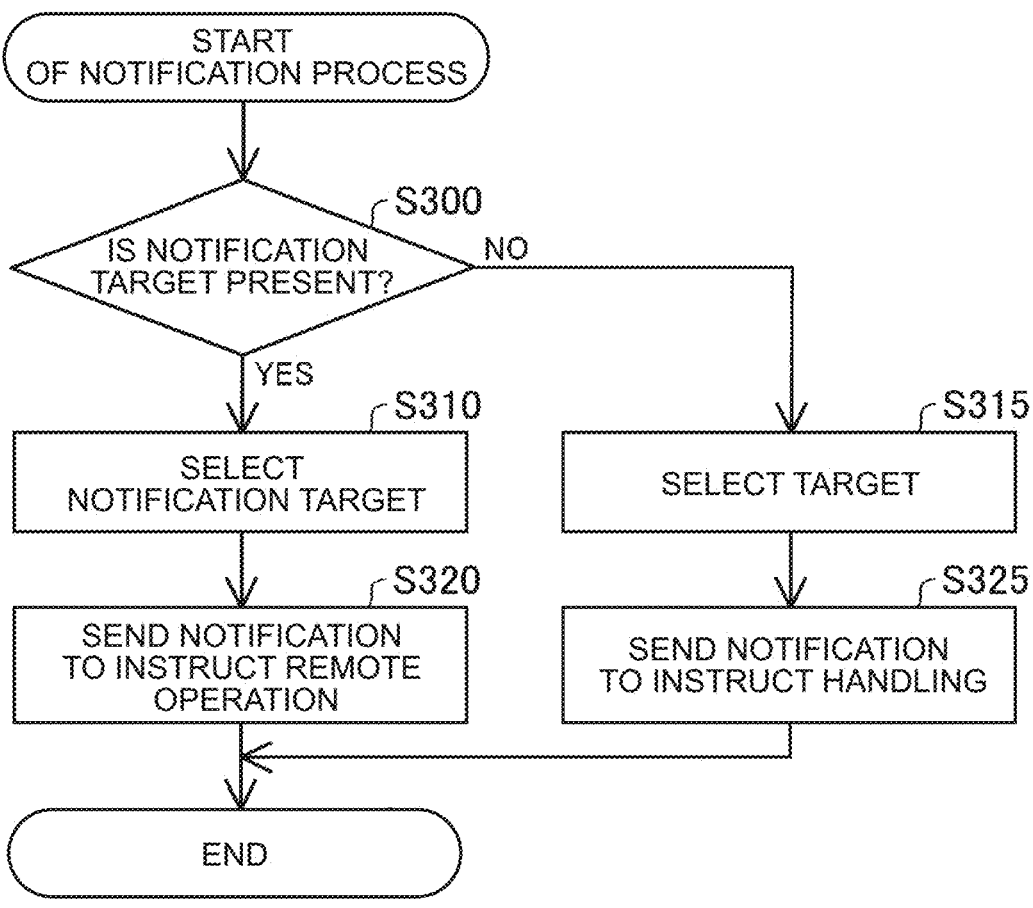
FIG. 10 is a flowchart illustrating an example of a notification process according to a fifth embodiment.

FIG. 10 is a flowchart illustrating an example of a notification process according to a fifth embodiment. The notification process according to the fifth embodiment is different from that according to the fourth embodiment in that an instruction to handle the abnormal state of the mobile body 200 is sent when no notification target is present. The configuration of the remote operation system 10 according to the fifth embodiment is the same as that according to the fourth embodiment.

In step S300, the notification device 110B determines whether a notification target is present. More specifically, the notification device 110B determines whether a specification target 400 that meets the second specification condition is present. When a specification target 400 that meets the second specification condition is present, that is, when a notification target is present, the notification device 110B proceeds to the process in step S310. When a specification target 400 that meets the second specification condition is not present, that is, when a notification target is not present, on the other hand, the notification device 110B proceeds to the process in step S315.

In step S315, the notification device 110B specifies a target. For example, the notification device 110B specifies a target that meets the first specification condition discussed above. The first specification condition is different from the second specification condition.

In step S325, the notification device 110B sends a notification to instruct handling of the abnormal state of the mobile body 200 to the target specified in step S315. More specifically, the notification device 110B sends a notification to the terminal device T1 of the worker WO as the target and the terminal device T2 installed at the station OF as the target.

With the notification device 110B according to the fifth embodiment described above, a notification to instruct handling of the abnormal state of the mobile body 200 is made when no notification target is present. Therefore, the abnormal state of the mobile body 200 can be handled even when remote operations cannot be performed using the input device 121.

F. Other Embodiments (F1) In the embodiments discussed above, the detection devices 300 are cameras. However, the detection devices 300 may not be cameras, and may be LiDARs, for example. In this case, the detection devices 300 output three-dimensional point cloud data as the detection result. The control device 100 and the mobile body control device 250 may calculate the position and the orientation of the mobile body through template matching in which the three-dimensional point cloud data as the detection result and reference point cloud data are used, for example. Iterative closest point (ICP) and normal distributions transform (NDT), for example, are used as an algorithm for the template matching. The reference point cloud data may be generated based on three-dimensional computer-aided design (CAD) data that represent the outer shape of the mobile body 200, for example.

(F2) In the embodiments described above, the control device 100 executes processes from acquiring position information on the mobile body 200 to generating a travel control signal. On the contrary, the mobile body 200 may execute at least a part of the processes from acquiring position information on the mobile body 200 to generating a travel control signal. For example, the following aspects (1) to (3) may be used.

(1) The control device 100 may acquire position information on the mobile body 200, determine a target position for which the mobile body 200 should be bound next, and generate a path from a present location of the mobile body 200 represented by the acquired position information to the target position. The control device 100 may generate a path to the target position between the present location and a destination location, or may generate a path to the destination location. The control device 100 may transmit the generated path to the mobile body 200. The mobile body control device 250 may generate a travel control signal such that the mobile body 200 travels on the path received from the control device 100, and control the drive device 220, the steering device 230, and the braking device 240 using the generated travel control signal.

(2) The control device 100 may acquire position information on the mobile body 200, and transmit the acquired position information to the mobile body 200. The mobile body control device 250 may determine a target position for which the mobile body 200 should be bound next, generate a path from a present location of the mobile body 200 represented by the received position information to the target position, generate a travel control signal such that the mobile body 200 travels on the generated path, and control the drive device 220, the steering device 230, and the braking device 240 using the generated travel control signal.

(3) In the above aspects (1) and (2), a detection result output from the external sensor 270 or the internal sensor 280 may be used in at least one of the generation of a path and the generation of a travel control signal. For example, in the above aspect (1), the control device 100 may acquire a detection result from the external sensor 270 or the internal sensor 280 and reflect the detection result from the external sensor 270 or the internal sensor 280 in a path when generating a path. In the above aspect (1), the mobile body 200 may acquire a detection result from the external sensor 270 or the internal sensor 280 and reflect the detection result from the external sensor 270 or the internal sensor 280 in a travel control signal when generating a travel control signal. In the above aspect (2), the mobile body 200 may acquire a detection result from the external sensor 270 or the internal sensor 280 and reflect the detection result from the external sensor 270 or the internal sensor 280 in a path when generating a path. In the above aspect (2), the mobile body 200 may acquire a detection result from the external sensor 270 or the internal sensor 280 and reflect the detection result from the external sensor 270 or the internal sensor 280 in a travel control signal when generating a travel control signal.

(4) In the embodiments discussed above, the control device 100 automatically generates a travel control signal to be transmitted to the mobile body 200. On the contrary, the control device 100 may generate a travel control signal to be transmitted to the mobile body 200 according to operations by an operator positioned outside the mobile body 200. For example, the operator may operate a manipulation device that includes a display that displays an image output from the detection devices 300, a steering wheel, an accelerator pedal, and a brake pedal that are used to remotely operate the mobile body 200, and a communication device that communicates with the control device 100 through wired communication or wireless communication, and the control device 100 may generate a travel control signal according to operations performed on the manipulation device.

(F3) In the embodiments discussed above, it is only necessary that the mobile body 200 should include components that enable movement through unattended operation, and the mobile body 200 may be in the form of a platform that includes the following components, for example. Specifically, it is only necessary that the mobile body 200 should include at least a mobile body control device 250, the drive device, the steering device, and the braking device in order to implement three functions including "traveling", "turning", and "stopping" through unattended operation. In order for the mobile body 200 to acquire information from the outside for unattended operation, it is only necessary that the mobile body 200 should further include a communication device. That is, at least a part of interior parts such as a driver's seat or a dashboard may not be mounted to the mobile body 200 that is movable through unattended operation, at least a part of exterior parts such as a bumper or a fender may not be mounted to the mobile body 200, or a body shell may not be mounted to the mobile body 200. In this case, the remaining parts such as a body shell may be mounted to the mobile body 200 before the mobile body 200 is shipped from the factory, or the remaining parts such as a body shell may be mounted to the mobile body 200 after the mobile body 200 is shipped from the factory without the remaining parts such as a body shell mounted to the mobile body 200. The parts may be mounted to the mobile body 200 from any direction, including the upper side, the lower side, the front side, the rear side, the right side, and the left side, and may be mounted from the same direction or from different directions.

(F4) The mobile body 200 may be manufactured by combining a plurality of modules. The modules each mean a unit constituted of a plurality of parts grouped according to the area or the function in the mobile body 200. For example, the platform of the mobile body 200 may be manufactured by combining a front module that constitutes a front part of the platform, a center module that constitutes a center part of the platform, and a rear module that constitutes a rear part of the platform. The number of modules that constitute the platform is not limited to three, and may be two or less or four or more. The modules may include a part that constitutes a portion of the mobile body 200 that is different from the platform, in addition to or in place of the parts that constitute the platform. The various modules may include any exterior part such as a bumper or a grille, or any interior part such as a seat or a console. Not only the mobile body 200 but also mobile bodies in any aspect may be manufactured by combining a plurality of modules. Such modules may be manufactured by joining a plurality of parts by welding, using a fixture, etc., or may be manufactured by integrally molding at least a part of parts that constitute a module as a single part by casting, for example. The method of integrally molding a single part, in particular a relatively large part, is called gigacasting or megacasting. For example, the front module, the center module, and the rear module described above may be manufactured by gigacasting.

(F5) Conveying the mobile body 200 using travel of the mobile body 200 through unattended operation is called "self-propelled conveyance". The configuration for implementing the self-propelled conveyance is called a "vehicle remote control autonomous travel conveyance system". The method of producing the mobile body 200 using the self-propelled conveyance is called "self-propelled production". In the self-propelled production, at least a part of conveyance of the mobile body 200 is implemented through self-propelled conveyance in a factory that manufactures the mobile body 200, for example.

Figure 11:
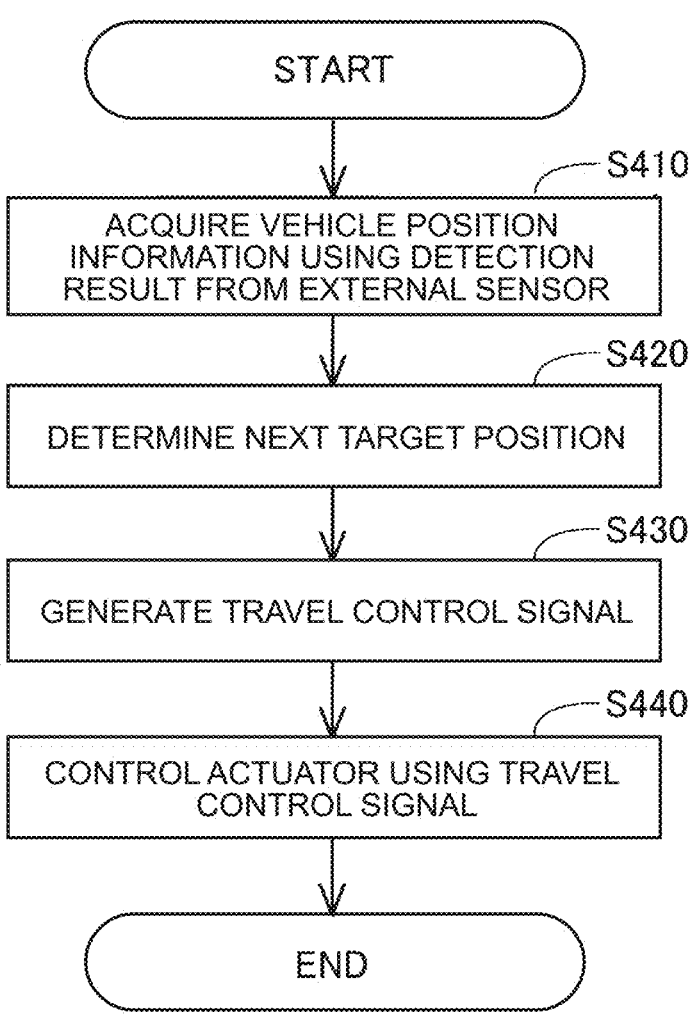
FIG. 11 is a flowchart illustrating an example of a method of causing a mobile body to travel according to another embodiment.

(F6) In the embodiments discussed above, the unattended operation in the automatic mode is performed by the remote automatic control device 130. This is not limiting, and the unattended operation in the automatic mode may be performed by the mobile body control device 250 mounted on the mobile body 200. FIG. 11 is a flowchart illustrating a method by which the mobile body control device 250 causes the mobile body 200 to travel through unattended operation. In step S410, the mobile body control device 250 mounted on the mobile body 200 acquires position information on the mobile body 200 using a detection result output from the detection devices 300. In step S420, the mobile body control device 250 determines a target position for which the mobile body 200 should be bound next. In the present embodiment, a reference path is stored in advance in the mobile body control device 250. In step S430, the mobile body control device 250 generates a travel control signal for causing the mobile body 200 to travel toward the determined target position. In step S440, the mobile body control device 250 controls the drive device 220, the steering device 230, and the braking device 240 using the generated travel control signal so as to cause the mobile body 200 to travel at the acceleration and the steering angle represented by the travel control signal. The mobile body control device 250 acquires position information on the mobile body 200, determines a target position, generates a travel control signal, and controls the drive device 220, the steering device 230, and the braking device 240 repeatedly in predetermined cycles.

A detection result output from the external sensor 270 or the internal sensor 280 may be used in at least one of the generation of a path and the generation of a travel control signal. For example, the mobile body 200 may acquire a detection result from the external sensor 270 or the internal sensor 280 and reflect the detection result from the external sensor 270 or the internal sensor 280 in a path when generating a path. The mobile body 200 may acquire a detection result from the external sensor 270 or the internal sensor 280 and reflect the detection result from the external sensor 270 or the internal sensor 280 in a travel control signal when generating a travel control signal.

The mobile body control device 250 may acquire position information using a detection result from the external sensor 270 or the internal sensor 280 of the mobile body 200, determine a target position for which the mobile body 200 should be bound next, generate a path from a present location of the mobile body 200 represented by the acquired position information to the target position, generate a travel control signal for traveling along the generated path, and control the drive device 220, the steering device 230, and the braking device 240 using the generated travel control signal. In this case, the mobile body 200 can travel without using a detection result from the detection devices 300 at all. The mobile body 200 may acquire a target arrival time and traffic congestion information from the outside of the mobile body 200 and reflect the target arrival time or the traffic congestion information in at least one of a path and a travel control signal.

(F7) In the embodiments discussed above, the abnormal state of the mobile body 200 corresponds to an abnormal stop of the mobile body 200. This is not limiting, and the abnormal state of the mobile body 200 may correspond to the occurrence of a failure in a communication line between the control device 100 and the mobile body 200 or the occurrence of a failure in the control device 100 itself, for example.

(F8) In the embodiments discussed above, the remote manual control device 120 and the remote automatic control device 130 are constituted integrally with each other as the control device 100. This is not limiting, and the remote manual control device 120 and the remote automatic control device 130 may be constituted separately from each other in the control device 100. The control device 100 and the notification device 110, 110B may be constituted integrally with each other. The control device 100 may be configured to include the notification device 110, 110B, or the notification device 110, 110B may be configured to include the control device 100.

(F9) In the embodiments discussed above, the specification target 400 includes a plurality of workers WO and a plurality of stations OF. This is not limiting, and the specification target 400 may include at least one of the worker WO and the station OF.

(F10) In the embodiments discussed above, the handling of the stop of the mobile body 200 is collection of the mobile body 200. This is not limiting, and the handling of the stop of the mobile body 200 may be to repair the cause of the stop of the mobile body 200 and move the mobile body 200.

(F11) In the embodiments discussed above, the notification device 110, 110B sends a notification of the mobile body position as the position of the mobile body 200 to be handled for an abnormal state, together with an instruction to handle the abnormal state. This is not limiting, and the notification device 110 may send only an instruction to handle the abnormal state. In this case, the handling of the abnormal state is work including specification of the mobile body 200 in an abnormal state.

(F12) In the third embodiment discussed above, the notification device 110 instructs the remote automatic control device 130 to perform control so as to evacuate the mobile body 200 when no notification target is present. This is not limiting, and the notification device 110 may instruct the remote manual control device 120 to perform control so as to evacuate the mobile body 200. More specifically, the notification device 110 may send a notification to instruct operations of the input device 121 to a target that meets a second specification condition that is different from the first specification condition, for example.

(F13) In the fifth embodiment discussed above, the notification device 110B sends a notification to instruct handling of the stop of the mobile body 200 to the specified target when no notification target is present. This is not limiting, and the notification device 110B may instruct the remote automatic control device 130 to perform control so as to evacuate the mobile body 200.

The present disclosure is not limited to the above embodiments, and can be implemented by a variety of configurations without departing from the spirit of the present disclosure. For example, the technical features in the embodiments corresponding to the technical features in the aspects described in "SUMMARY" can be replaced or combined, as appropriate, in order to address the above issue or achieve some or all of the above effects. When the technical features are not described as essential herein, such technical features can be omitted as appropriate.

What is claimed is:

1. A notification device comprising a processor configured to:

receive a signal that indicates occurrence of an abnormal state of a mobile body that is movable through unattended operation, and specify a notification target that meets a specification condition determined in advance from one or more specification targets that include at least one of a worker and a station; and send a notification to instruct handling of the abnormal state of the mobile body to the specified notification target, wherein:

the unattended operation includes a manual mode based on operations performed by the worker using an input device provided at a different location from the mobile body, and an automatic mode not based on operations performed by the worker using the input device;

the abnormal state is caused in the automatic mode; and the handling is an operation of the input device; and further comprising a storage unit that stores an installation position of the input device, and wherein, the specification condition includes a distance between the installation position and a located position of a specification target of the one or more specification targets being equal to or less than a threshold distance determined in advance; and the processor is configured to specify the specification target for which the distance between the installation position and the located position is equal to or less than the threshold distance.

2. The notification device according to claim 1, wherein the handling does not include controlling the mobile body through the unattended operation.

3. The notification device according to claim 2, wherein the processor is configured to notify the notification target of a mobile body position that indicates a position of the mobile body.

4. The notification device according to claim 3, wherein:

the specific condition includes a distance between the mobile body position and a located position of a specification target of the one or more specification targets being equal to or less than another threshold distance determined in advance; and the processor is configured to specify the specification target for which the distance between the mobile body position and the located position is equal to or less than the another threshold distance.

5. The notification device according to claim 2, wherein:

the specific condition includes a status of work of a specification target of the one or more specification targets; and the processor is configured to specify the specification target, the status of work of which allows the handling.

6. The notification device according to claim 5, wherein:

the specification condition includes that the specification target is not performing work that is more urgent than the handling of the abnormal state; and the processor is configured to specify the specification target that is not performing the work that is more urgent.

7. The notification device according to claim 2, wherein:

the specification condition includes a manufacturing process in which the mobile body is positioned; and the processor is configured to specify a specification target of the one or more specification targets correlated with the manufacturing process.

8. The notification device according to claim 2, wherein:

the specification condition includes a cause of the occurrence of the abnormal state; and the processor is configured to specify a specification target of the one or more specification targets capable of handling the cause.

9. The notification device according to claim 2, wherein the processor is configured to notify the notification target that the handling is completed in response to the handling being completed.

10. The notification device according to claim 1, wherein:

the specific condition includes a status of work of a specification target of the one or more specification targets; and the processor is configured to specify the specification target in a status of work that allows the specification target to operate the input device.

11. The notification device according to claim 10, wherein:

the specification condition includes that the specification target is not performing work that is more urgent than the handling of the abnormal state; and the processor is configured to specify the specification target that is not performing the work that is more urgent.

12. The notification device according to claim 1, wherein the processor is configured to send a notification to instruct the handling of the abnormal state of the mobile body, the handling not including controlling the mobile body through the unattended operation, to at least a part of the one or more specification targets when the notification target that meets the specification condition is not present.

* * * * *